United States Patent
Lewis

(10) Patent No.: US 8,040,978 B2
(45) Date of Patent: Oct. 18, 2011

(54) TRACKING SYSTEM

(75) Inventor: Michael Lewis, Märsta (SE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/543,487

(22) Filed: Aug. 18, 2009

(65) Prior Publication Data
US 2009/0310722 A1 Dec. 17, 2009

Related U.S. Application Data

(63) Continuation of application No. 10/848,933, filed on May 19, 2004, now Pat. No. 7,751,501.

(51) Int. Cl.
*H04L 27/00* (2006.01)

(52) U.S. Cl. ........................................ 375/326

(58) Field of Classification Search ...................... None
See application file for complete search history.

(56) References Cited

U.S. PATENT DOCUMENTS 7,751,501 B2 * 7/2010 Lewis ........................... 375/326

OTHER PUBLICATIONS

File History, U.S. Appl. No. 10/848,933, Patent No. 7,751,501, filed May 19, 2004, Sep. 25, 2009 Advisory Action (PTOL-303), Jul. 9, 2009 Final Rejection, May 15, 2007 Non-Final Rejection, Oct. 24, 2007 Non-Final Rejection, Apr. 18, 2008 Non-Final Rejection, Oct. 30, 2008 Non-Final Rejection, Nov. 17, 2009 Non-Final Rejection, and Nov. 17, 2009 Non-Final Rejection.

* cited by examiner

*Primary Examiner* — Khanh C Tran
(74) *Attorney, Agent, or Firm* — SpryIP, LLC

(57) ABSTRACT

The present invention relates to a tracking system comprised in a receiver, which tracking system is operable to track rapid changes in frequency and phase offset. The tracking system comprises a first system operable to perform a pilot-based phase and frequency tracking. The tracking system also comprises a second system operable to perform data-based phase and frequency tracking. The tracking system also comprises a control means connected to said first system and to said second system, which control means is operable to gradually reduce the effect of said first system, i.e. said pilot-based phase and frequency tracking.

7 Claims, 9 Drawing Sheets

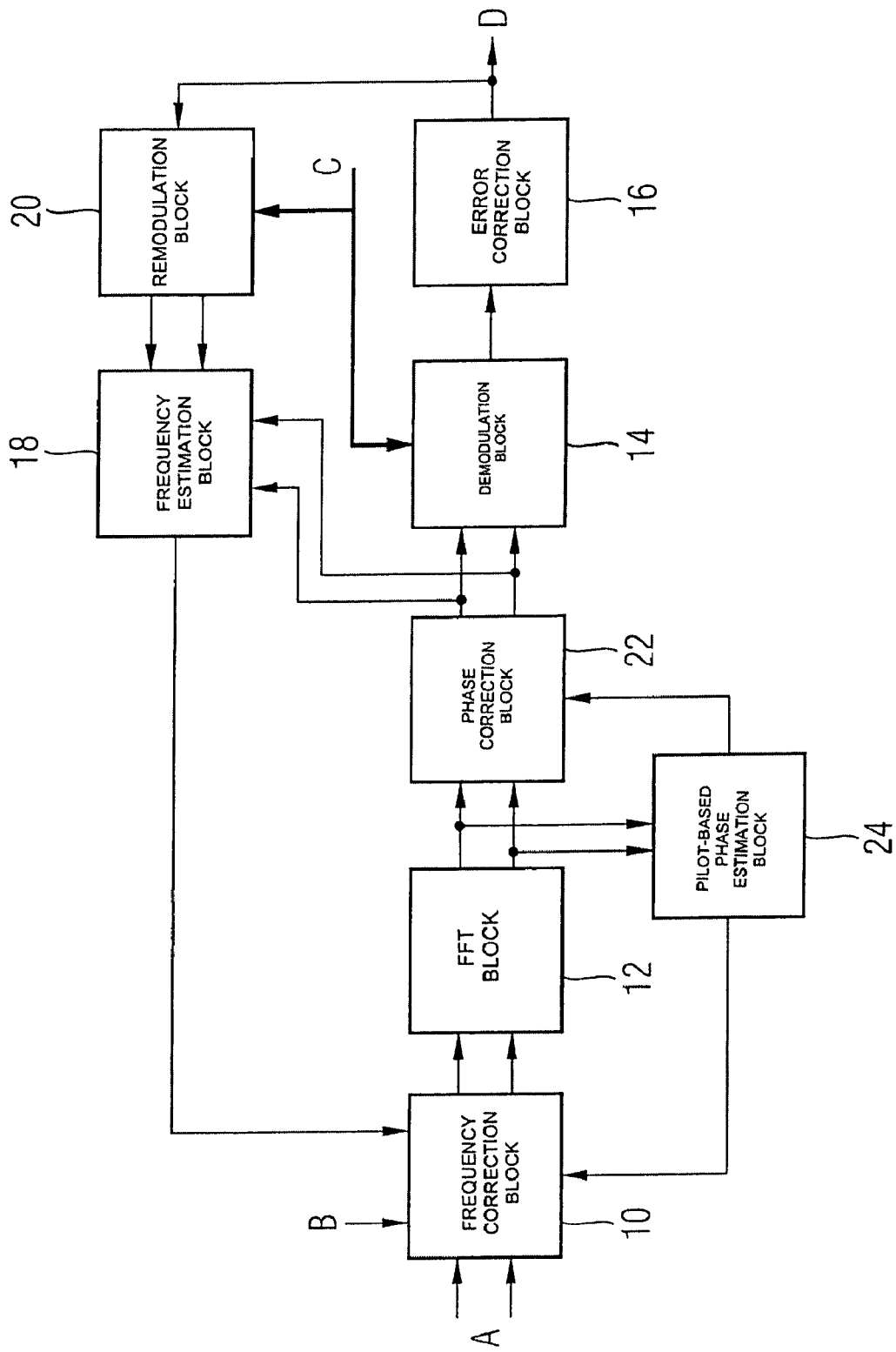

FIG 11
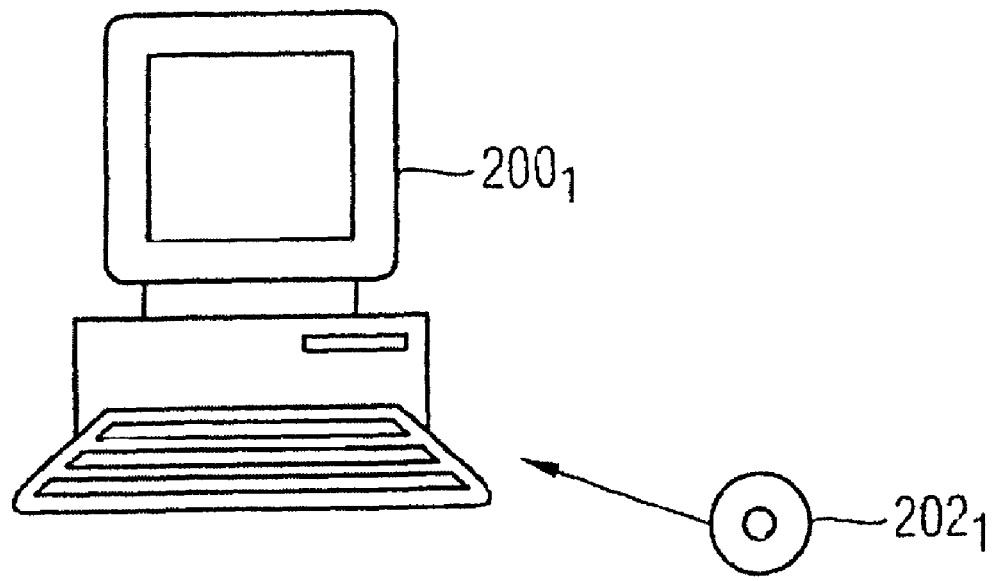
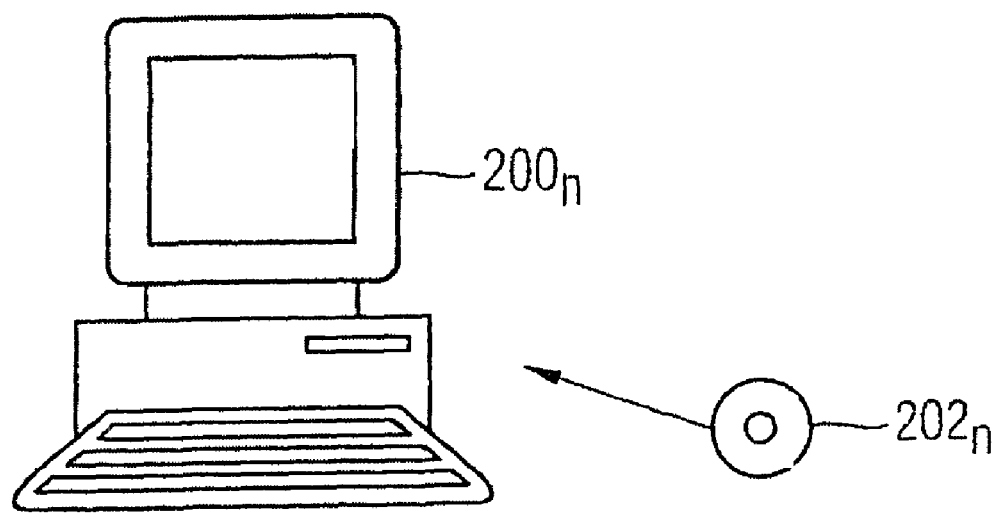

TRACKING SYSTEM

RELATED APPLICATIONS

This application is a Continuation Application of application Ser. No. 10/848,933. The priority of the Application is hereby claimed and the entirety thereof is hereby incorporated herein by reference.

BACKGROUND

A well-known issue in designing transceiver systems in which rapid transitions must be made between e.g. receive and transmit states or between idle and receive states, is that the local oscillators on the system can suffer a perturbation from their stable operating frequency. This can, for example, be due to a sudden change in load on the power supply. An example of such a glitch is shown in FIG. 1, related to the preamble of an IEEE 802.11 WLAN OFDM transmission. In FIG. 1, reference numeral 2 denotes the short preamble symbols, 4 denotes the cyclic prefix (CP) and the long preamble symbols, 6 denotes the SIGNAL field and 8 denotes the data symbols. The VCO frequency is shown initially at one stable level; when the transmission begins, the operating conditions change and the VCO moves to a different stable operating frequency. Since the VCO operates in a feedback loop, it takes time for the frequency to converge on the new stable operating frequency.

Although it may be possible to design ones own receiver to have an extremely stable VCO, it is impossible in an open market such as that for WLAN devices to be sure that competitors' devices have equally high standard for their transmitters. To be interoperable, it is therefore necessary to be able to compensate for such deviations.

In a typical WLAN receiver, an initial coarse estimate of the frequency offset will be made during the short preamble symbols. A more precise estimate will be made during the long preamble symbols. The changing frequency of the VCO means that the frequency estimates are likely to be inaccurate; and even if a fairly accurate frequency estimate has been made by the end of the long preamble symbols, the frequency is likely to change further.

The problems caused by a residual frequency error will be explained with reference to the operation of a simplified digital OFDM receiver datapath as shown in FIG. 2.

The first operation in the datapath is to correct the frequency error, which is achieved by a progressively phase rotation of the incoming I/Q samples, which is intended to exactly cancel out the phase rotation of the incoming signal due to the frequency offset. In the absence of any other input, the frequency correction is based on the initial frequency estimate.

This operation is performed in the frequency correction block 10.

The next operation is to perform a fast Fourier transform (FFT), at the block 12, on the received data. This separates the received time-domain symbol into a number of independently modulated sub-carriers. In an 802.11a OFDM transmission, there are 52 sub-carriers, of which 48 are used to transmit data and 4 are pilot tones modulated with a known sequence.

Next, the sub-carriers extracted by the FFT 12 are demodulated, at the demodulation block 14, (converted from symbols into [soft] data bits). In order to perform the demodulation, it is necessary to have an estimate of the channel transfer function for each subcarrier, which is represented by a scaling and a rotation of the transmitted constellation. The initial channel estimate is typically obtained during the long preamble symbols.

Finally, error correction, at the error correction block 16, is applied to the received data stream. In an 802.11 OFDM transmission, a Viterbi decoder is typically used to perform the error correction function.

D denotes the data outputted from the OFDM receiver.

A residual frequency error means that the frequency correction block will not completely remove the frequency offset. The first problem that this causes is that there is a progressively increasing phase rotation of the received signal at the output of the frequency correction block. The demodulation process is based on the received signal phase as estimated during the long preamble. The progressive phase rotation caused by the frequency error means that there will be an increasing phase error with respect to the channel estimate. At a certain point, this will lead to uncorrectable demodulation errors. An example of this is shown in FIG. 3: the unrotated received I/Q vector is shown as a solid line, and is near to the correct constellation point corresponding to the transmitted data. E denotes the correct constellation point for received vector and F denotes all of the ideal constellation points according to channel estimate. As the received vector is progressively rotated away from E, it is clear to see that at some point demodulation errors occur. To keep a reasonable degree of clarity in the figure, the example shown uses 16-QAM modulation; IEEE 802.11 OFDM transmissions also use 64-QAM for higher rate transmissions. Since 64-QAM has 4 times as many constellation points it is clearly much more sensitive to phase errors.

A second problem, caused by moderate to severe frequency estimation errors, is loss of orthogonality in the FFT. In the absence of a frequency error, the subcarriers are perfectly separable from one another (the energy from one subcarrier does not interfere at all with another subcarrier). However, if the frequency offset becomes at all large, a significant amount of inter-carrier interference occurs which is visible as noise in the signal at the demodulator.

If it is possible to measure the phase and frequency errors of the signal during reception, it is conceptually possible to correct for them. The phase error of a received I/Q vector can be estimated based on knowledge of the channel estimate and the transmitted constellation point, by directly measuring the angle from the expected constellation point and the actual received vector. This estimate is perturbed by errors in the channel estimate and by noise; an improved estimate for the phase can be obtained in an OFDM symbol by measuring the phase error over a number of subcarriers, possibly also with weighting according to the strength of the subcarrier signals.

The frequency error is simply the change in the phase estimate with time, and can be estimated by dividing the phase change between two symbols with the symbol period.

As mentioned, in order to estimate the phase and frequency error, it is necessary to know the constellation point corresponding to the transmitted signal. One possible solution to this problem is to use the demodulated data to try to determine the correct constellation point, using an architecture such as that shown in FIG. 4, called data-driven phase and frequency tracking. The corresponding function blocks in FIGS. 2 and 4 have been denoted with the same reference signs and will not be explained again. In FIG. 4 there is also disclosed a frequency estimation block 18 connected to the block 12 and to the block 10. Finally, there is also a remodulation block 20 connected to the frequency estimation block 18. Demodulated data can be taken at two possible locations: for greatest robustness, it should be taken at the output of the error correction block, since this ensures the minimum number of selection errors. However, it may also be taken from before the error correction block.

This demodulated data is then re-modulated (mapped back into I/Q constellation points) for each subcarrier in the OFDM symbol, based on the channel estimate. It is then possible to use all of the subcarriers in the OFDM symbol to make an estimate of the overall phase rotation of the OFDM symbol.

Typically, this phase error is used as an input to a PID (proportional, integral, derivative) control loop, which uses the instantaneous estimates for the phase and frequency error plus an integral phase term to drive the input to the frequency correction block, thereby simultaneously tracking errors in both phase and frequency.

As was mentioned earlier, an IEEE 802.11a OFDM transmission uses only 48 of the 52 subcarriers for carrying data. The remaining 4 pilot tones are modulated with a known sequence, and these can therefore be used directly for the measurement of phase error.

An example architecture is shown in FIG. 5, called pilot-based phase and frequency tracking. The corresponding function blocks in FIGS. 2, 4 and 5 have been denoted with the same reference signs and will not be explained again. In FIG. 5 there is also disclosed a phase correction block 22 connected to the block 12 and to the block 14. Finally, there is also a pilot-based phase estimation block 24 connected to the block 10 and to the block 22. The pilot-based phase estimation block extracts the pilot subcarriers from the data stream, and uses them to calculate an estimate of the phase rotation for the current OFDM symbol. This estimate of the phase error is then used by the phase correction block, which de-rotates the received symbol prior to demodulation.

It is also necessary to correct the frequency error in order to avoid loss of FFT orthogonality. This is done by estimating the residual frequency error based on the symbol-by-symbol rate of phase change, and feeding back this estimate to the frequency correction block, which adds the residual frequency error estimate to the correction frequency.

Data-driven frequency and phase tracking has the advantage that it maximises noise rejection by taking into account all of the available subcarriers in the signal. However, a major drawback is that, in order to obtain reliable data estimates, it is necessary to take the data from the output of the error correction block. This block has a large latency (usually several data symbols), which means that the frequency tracking loop is very slow to respond. For all but very minor residual frequency errors, the accumulated phase error will become so great that demodulation fails and the frequency tracking loop breaks down.

The pilot-based method is very robust, since the pilot tones are known in advance and the phase correction is applied immediately, and can therefore cope with large and rapid swings in frequency. The problem with the pilot-based solution, however, is the noise introduced by the phase estimate due to it being made over only the 4 pilot subcarriers. This noise directly modulates the received symbol, increasing the error vector magnitude and thereby the error probability.

Since large and rapid frequency deviations are observed only near the beginning of the transmission, it is desirable to be able to use robust pilot-based tracking near the beginning of the transmission, but to switch over to less noisy, but slower data-based tracking for the remainder of the transmission, using a combined architecture such as that shown in FIG. 6. The corresponding function blocks in FIGS. 2, 4-6 have been denoted with the same reference signs and will not be explained again. However, this is difficult to achieve in practice, due to the error properties of the pilot-based tracking method.

The phase estimate calculated from the pilot subcarriers has an accuracy that is adequate for demodulation. However, the frequency error is based on the slope calculated over two such noisy estimates, and is therefore much more prone to noise which causes random frequency deviations from the symbol to symbol.

When the pilot-based phase correction is being performed, the phase deviations from these random frequency deviations are corrected for. However, when pilot-based tracking is deactivated, the frequency correction block maintains the frequency error from the last estimate. Since the data-based frequency tracking loop has a latency of several symbols, the overall phase error increases in just the same way as happened with the original VCO frequency deviation, and will often cause failure before the frequency tracking loop can correct for the residual error.

SUMMARY OF THE INVENTION

The object with the present invention is to solve the above mentioned problems. The tracking system according to the present invention is comprised in a receiver. The tracking system is operable to track rapid changes in frequency and phase offset of the received signal. The tracking system comprises a first system operable to perform a pilot-based phase and frequency tracking. The tracking system also comprises a second system operable to perform data-based phase and frequency tracking. The tracking system also comprises control means connected to said first system and to said second system, wherein the control means is operable to gradually reduce the effect of said first system.

An advantage of the tracking system according to the present invention is that it allows a smooth transition from pilot-based to data-based frequency estimation. This allows the receiver to deal with violent frequency deviations during the VCO settling at the start of the transmission, while minimizing the error vector magnitude and thereby also minimizing the packet error probability for long transmissions.

A further advantage in this connection is achieved if said control means comprises at least one weighting means operable to gradually decrease the weight factors to gradually reduce said effect of said first system.

In this connection, a further advantage is achieved if said control means also comprises a first estimating means operable to perform an estimate of the phase of the received symbol, and a phase differentiator connected to said first estimating means wherein the phase differentiator is operable to calculate the phase increment between two consecutive symbols. In addition, a first weighting means is connected to the phase differentiator, and a frequency scaling means is connected to the weighting means, wherein the frequency scaling means is operable to scale the weighted value to obtain a frequency correction increment output.

A further advantage in this connection is achieved if said control means also comprises a second weighting means connected to said phase differentiator that is operable to multiply said phase increment with a weight factor. In addition, a phase integrator is connected to said second weighting means and is operable to sum together all of said individual phase increments to obtain a phase error estimate output.

In this connection, a further advantage is achieved if said control means also comprises a symbol counter means connected to said first weighting means and to said second weighting means that is operable to count the symbols in order to use a weight factor that depends on the symbol number.

A further advantage in this connection is achieved if said system comprises a frequency correction means operable to correct a frequency error of a received symbol. In addition, a transforming means is connected to said frequency correction means and is operable to perform a Fourier transform operation resulting in a number of independently modulated subcarriers, wherein said transforming means is connected to said first estimating means and said frequency scaling means is connected to said frequency correction means. The tracking system also comprises a phase correction means operable to perform a correction of the symbol phase, wherein the phase correction means also is connected to said phase integrator. In addition, a demodulating means is connected to said phase correction means and is operable to demodulate said phase-corrected symbol to produce a data stream, and a remodulating means is connected to said demodulating means and is operable to remodulate said data stream. Lastly, a frequency estimation means is connected to said remodulating means, and an error correction means is connected to said demodulating means resulting in said final estimate of the received data symbols.

In this connection, a further advantage is achieved if said weight factors are set to 1 up to where the transition from pilot-based phase and frequency tracking to data-based phase and frequency tracking is to occur.

A further advantage in this connection is achieved if said weight factors for the same symbol number are equal for said first weighting means and for said second weighting means.

A further advantage in another embodiment is achieved if said weight factors for the same symbol number are unequal for said first weighting means and for said second weighting means.

The above mentioned problems are also solved with a method for tracking rapid changes in frequency and phase offset in a receiver. The method comprises: performing a pilot-based phase and frequency tracking, and performing a data-based phase and frequency tracking. The method further comprises: gradually reducing the effect of said pilot-based phase and frequency tracking.

An advantage with the method for tracking rapid changes in frequency and phase offset in a receiver according to the present invention is that it allows a smooth transition from pilot-based to data-based frequency estimation. This allows the receiver to deal with violent frequency deviations during the VCO settling at the start of the transmission, which minimizes the error vector magnitude and thereby also minimizes the packet error probability for long transmissions.

A further advantage in this connection is achieved if said method also comprises: gradually decreasing weight factors in order to gradually reduce the effect of said pilot-based phase and frequency tracking.

In this connection, a further advantage is achieved if said method also comprises: performing an estimate of the phase of the received symbol, calculating the phase increment between two consecutive symbols, weighting said phase increment with a first weight factor, and scaling said weighted value to obtain a frequency correction increment output.

A further advantage in this connection is achieved if said method comprises: weighting said phase increment with a second weight factor, and summing together all of said individual phase increments to obtain a phase error estimate output.

In this connection, a further advantage is achieved if said method also comprises: counting the symbols in order to use a weight factor that depends on the symbol number.

A further advantage in this connection is achieved if said method also comprises: correcting a frequency error of a received symbol, performing a Fourier transform operation resulting in a number of independently modulated subcarriers, performing a correction of the symbol phase, demodulating said phase-corrected symbol to produce a data stream, remodulating said data stream, and performing an error correction resulting in a final estimate of the received data symbols.

In this connection, a further advantage is achieved if said weight factors are set to 1 up to where the transition from pilot-based phase and frequency tracking to data-based phase and frequency tracking is to occur.

A further advantage in this connection is achieved if said first weight factor and said second weight factor for the same symbol number are equal.

A further advantage in another embodiment is achieved if said first weight factor and said second weight factor for the same symbol number are unequal.

The above mentioned problems are also solved with at least one computer program product. The computer program product(s) is/are directly loadable into the internal memory of at least one digital computer, comprising software code portion for performing the method described above when said product(s) is/are run on said at least one computer.

An advantage with the computer program product according to the present invention is that it allows a smooth transition from pilot-based to data-based frequency estimation. This allows the receiver to deal with violent frequency deviations during the VCO setting at the start of the transmission, while minimizing the error vector magnitude and thereby also minimizing the packet error probability for long transmissions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

FIG. 6 is a block diagram of a combined pilot- and data-based frequency and phase tracking system according to the prior art.

FIG. 11 shows some examples of computer program products according to the present invention.

DETAILED DESCRIPTION

Figure 1:
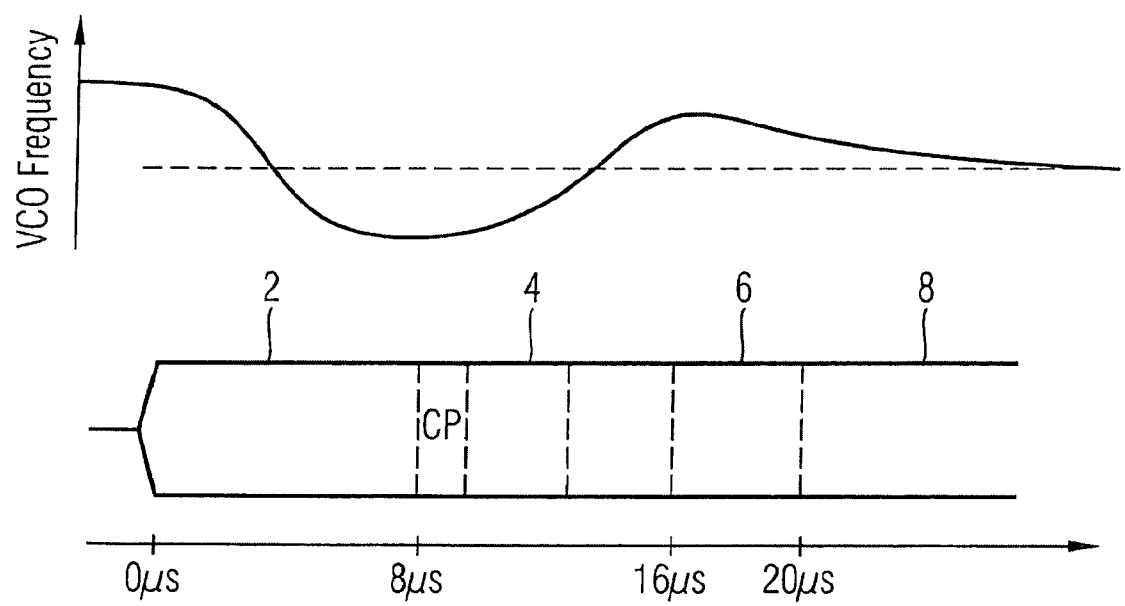
FIG. 1 shows an example of a VCO frequency deviation profile in relation to a 802.11a preamble.
Figure 2:
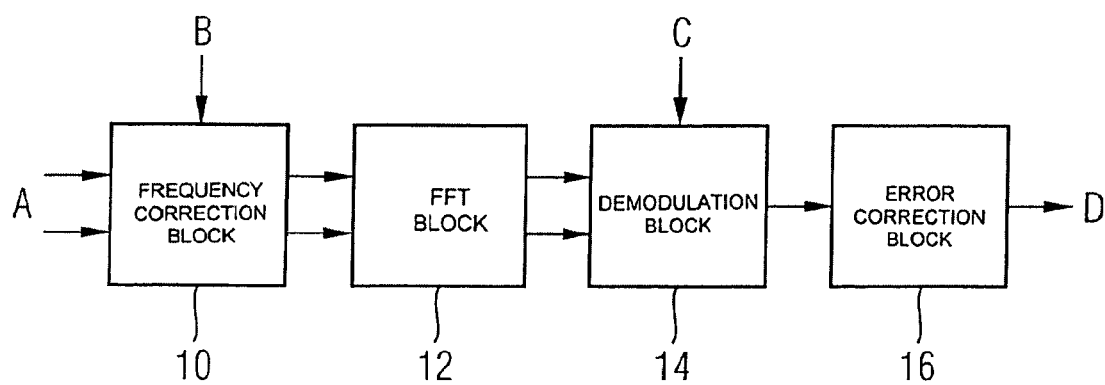
FIG. 2 is a block diagram of a digital OFDM receiver according to the prior art.
Figure 3:
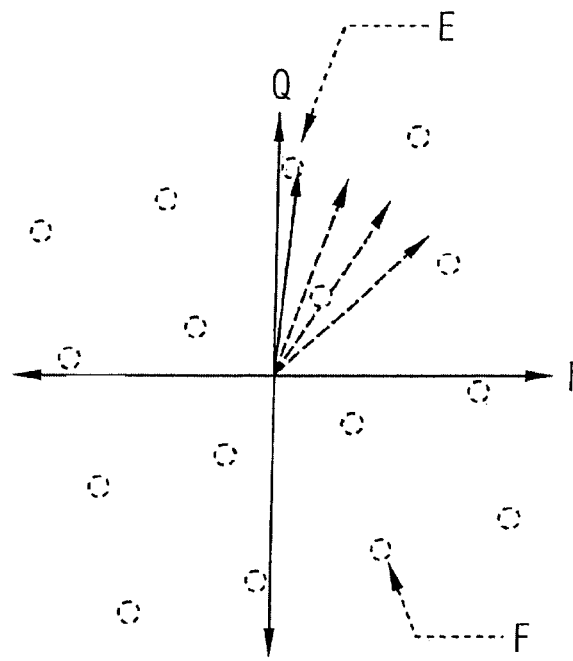
FIG. 3 is a I-Q-diagram disclosing the effect of signal phase rotation on demodulation.
Figure 4:
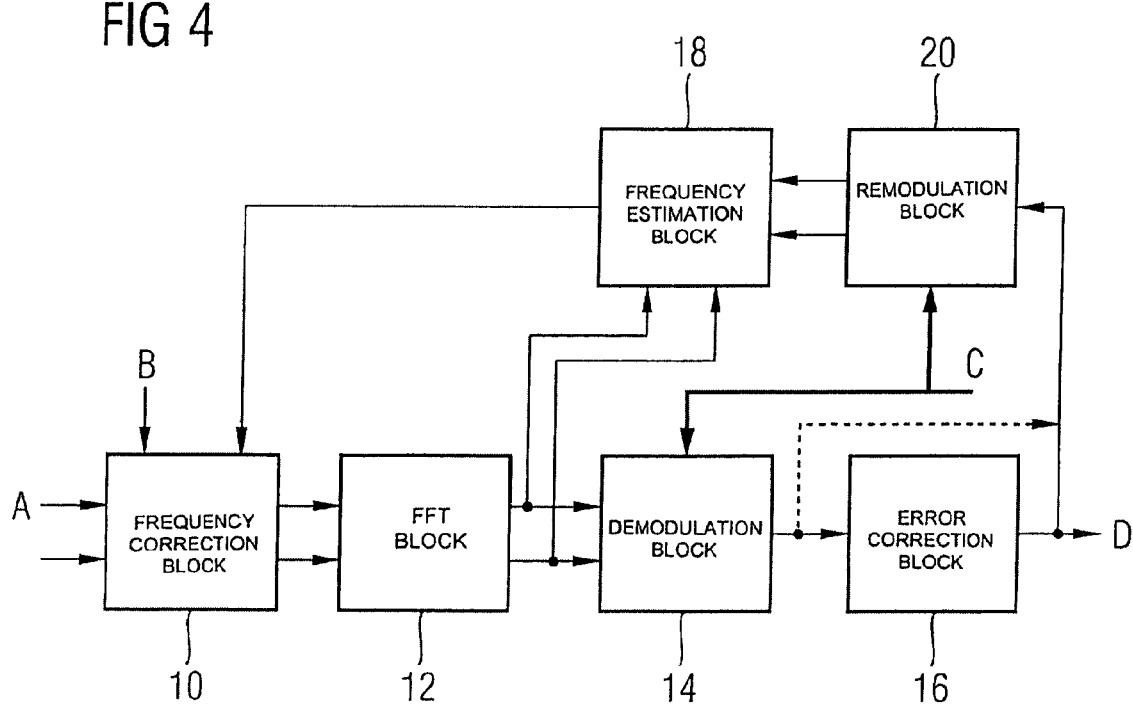
FIG. 4 is a block diagram of a data-based frequency and phase tracking system according to the prior art.
Figure 5:
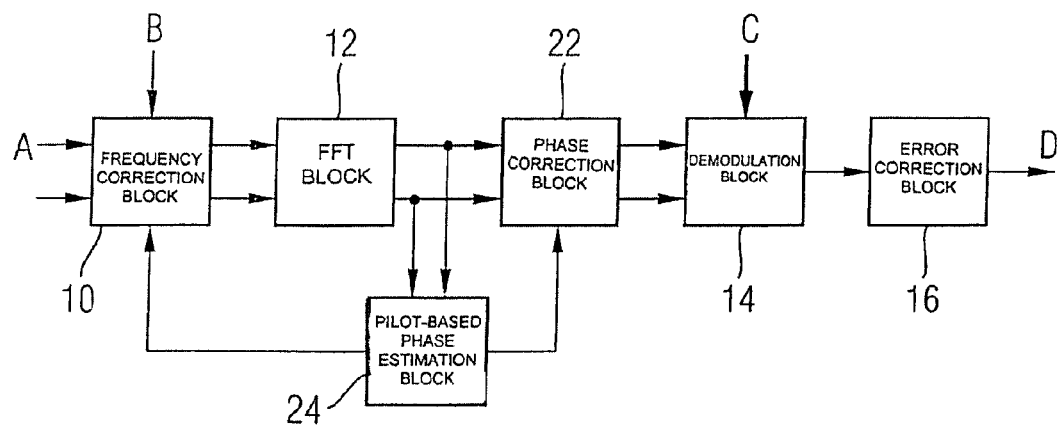
FIG. 5 is a block diagram of a pilot-based phase and frequency tracking system according to the prior art.
Figure 7:
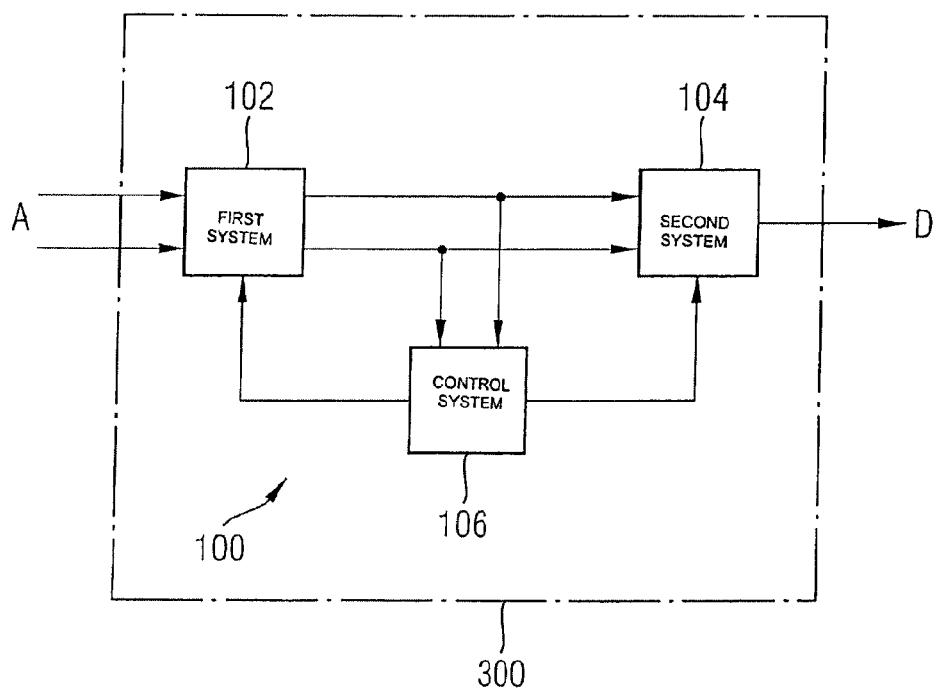
FIG. 7 is a block diagram of a tracking system operable to track rapid changes in frequency and phase offset according to the present invention.

In FIG. 7 there is disclosed a block diagram of a tracking system 100 according to the present invention. The tracking system 100 is comprised in a receiver 300, which only is disclosed diagrammatically in FIG. 7. The tracking system 100 is operable to track rapid changes in frequency and phase offset of the received signal. The tracking system 100 comprises a first system 102 operable to perform a pilot-based phase and frequency tracking. The tracking system 100 also comprises a second system 104 operable to perform data-based phase and frequency tracking. As is apparent from FIG. 7, the first system 102 is connected to the second system 104. The tracking system 100 also comprises a control means 106 connected to said first system 102 and to said second system 104 that is operable to gradually reduce the effect of said first system 102. This means that the transition from pilot-based to data-based phase and frequency tracking can be smooth, by gradually reducing the effect of the pilot-based tracking function rather than immediately switching it off. This allows the data-based tracking loop time to observe and correct for residual frequency error before the total phase error becomes large enough to cause demodulation errors.

Figure 8:
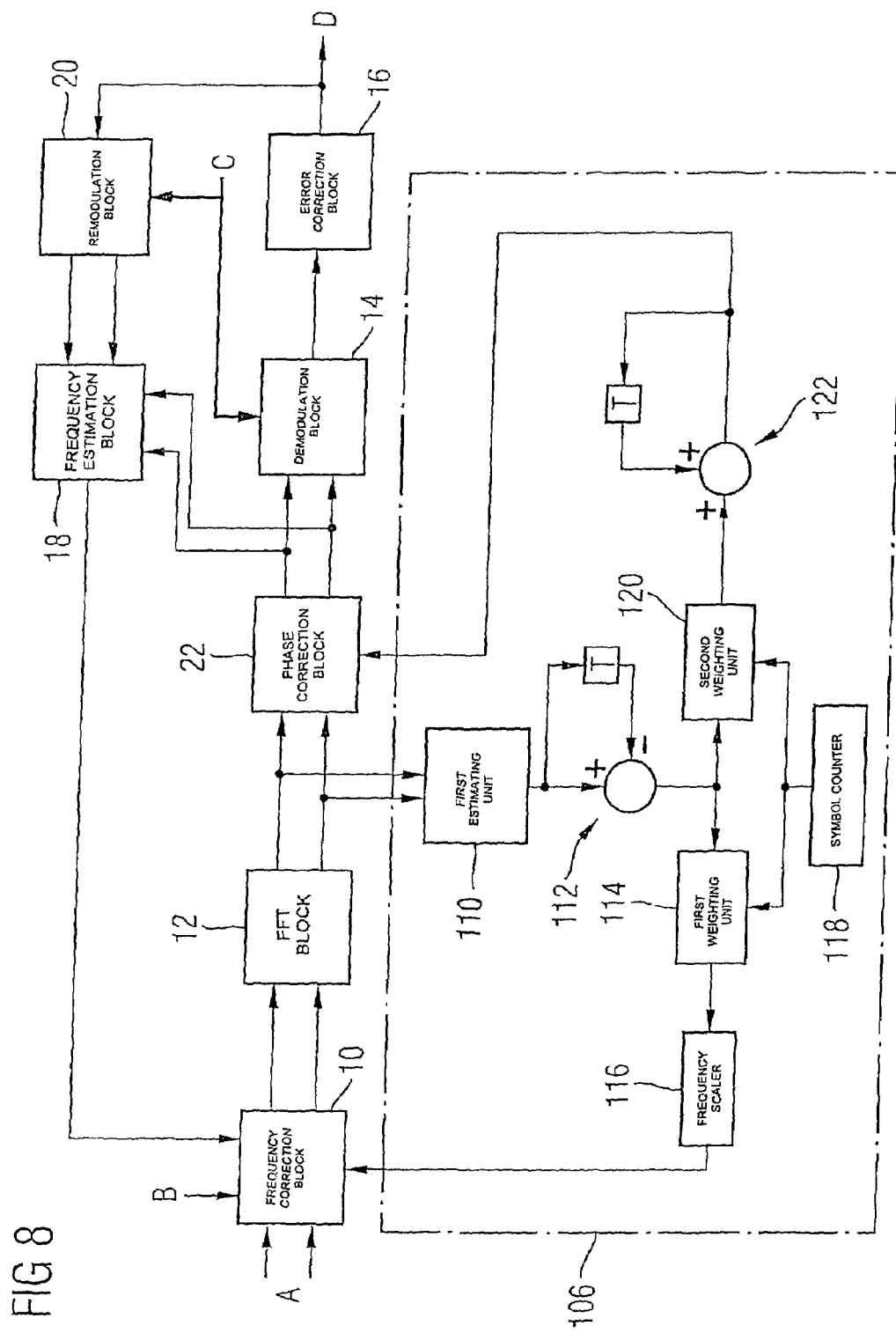
FIG. 8 is a more detailed block diagram of the tracking system disclosed in FIG. 7.

In FIG. 8 there is disclosed a more detailed block diagram of the tracking system 100 disclosed in FIG. 7. The tracking system 100 comprises a frequency correction means 10 operable to correct a frequency error of a received symbol A, e.g. I/Q Rx samples. A transforming means 12 is connected to said frequency correction means 10, which transforming means 12 is operable to perform a Fourier transform operation resulting in a number of independently modulated subcarriers.

The tracking system 100 also comprises a first estimating means 110 operable to perform an estimate of the phase of the received symbol based on the pilot tones. Connected to the first estimating means 110 is a phase differentiator 112 operable to calculate the phase increment between two consecutive symbols. The tracking system 100 also comprises a first weighting means 114 connected to the phase differentiator 112 that is operable to multiply the phase increment with a weight factor. Connected to said first weighting means 114 is a frequency scaling means 116 operable to scale the weighted value to obtain a frequency correction increment output which is input to said frequency correction means 10. The tracking system 100 also comprises a second weighting means 120 connected to said phase differentiator 112. The second weight means 120 is operable to multiply the extent of said phase differentiator 112 with a weight factor. Connected to said second weighting means 120 is a phase integrator 122 operable to sum together all of said individual phase increments to obtain a phase error estimate output which is input to a phase correction means 22 operable to perform a correction of the symbol phase. The tracking system 100 also comprises a demodulating means 14 connected to said phase correction means 22 that is operable to demodulate said phase-corrected symbol to produce a data stream. The tracking system 100 also comprises an error correction means 16 connected to said demodulating means 14 resulting in an estimate of the error-corrected data stream. The tracking system 100 also comprises a remodulating means 20 connected to said error correction means 16 that is operable to remodulate said data stream. Connected to said remodulating means 20 is a frequency estimating means 18, which uses the instantaneous estimates for the phase and frequency error plus an integral phase term to drive the input to the frequency correction means 10. The tracking system 100 also comprises a symbol counter means 118 connected to said first weighting means 114 and to said second weighting means 120 that is operable to count the symbols in order to use a weight factor that depends on the symbol number.

In a preferred embodiment of said tracking system said weight factors are set to 1 up to where the transition from pilot-based phase and frequency tracking to data-based phase and frequency tracking is to occur, In one embodiment of the tracking system 100 said weight factors for the same symbol number are equal for said first weighting means 114 and for said second weighting means 120.

In another embodiment of the tracking system 100 said weight factors for the same symbol number are unequal for said first weight weighting means 114 and for said second weighting means 120. This means that the transition points for the frequency and phase correction does not occur at the same place. For instance, it is advantageous to begin to reduce the frequency error correction a little earlier than the phase correction is reduced, so that the magnitude of the frequency deviations is reduced.

The same can be expressed with other words.

The weight factors are set to 1 up to the point where the transition from phase-to-data-based tracking is to occur. The pilot-based tracking is therefore completely functional up to this point; the data-based tracking may also be active at this stage, but will have a little effect since the phase error is being effectively removed (except for a small remaining random error).

At the point where the transition is to occur, after the initial VCO transient has subsided, the weight factors are gradually decreased. This means that the magnitude of the frequency correction changes will be gradually reduced. The phase correction will begin to change by less than the change in the phase estimate leading to a small residual error that will pass through to the data-based frequency correction.

In a digital implementation, the weighting factors will typically be chosen to be simple binary numbers, e.g. a weighting sequence might be 1, 1 . . . 1, 0.75, 0.75, 0.75, 0.5, 0.5, 0.25, 0.25, 0.25, 0, 0 . . . .

Figure 9:
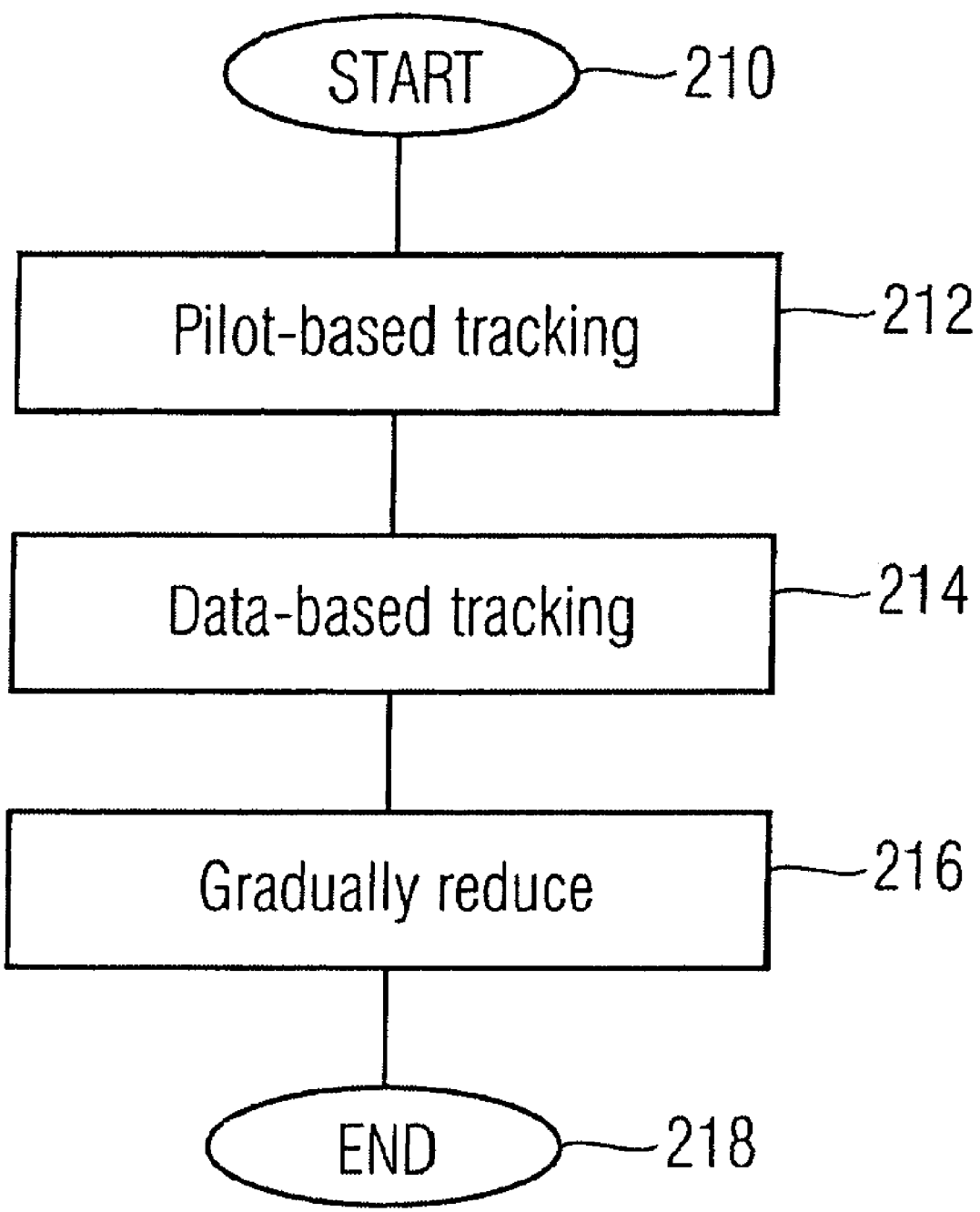
FIG. 9 is a flow chart of a method for tracking rapid changes in frequency and phase offset in a receiver according to the present invention.

In FIG. 9 there is disclosed a flow chart of the method for tracking rapid changes in frequency and phase offset in a receiver according to the present invention. The method begins at block 210. The method continues, at block 212, with the step: to perform a pilot-based phase and frequency tracking. Thereafter, the method continues, at block 214, with the step: to perform a data-based phase and frequency tracking. The method continues, at block 216, with the step: to gradually reduce the effect of said pilot-based phase and frequency tracking. The method is finished at block 218. This means that the transaction from pilot-based to data-based phase and frequency tracking becomes smooth by gradually reducing the effect of the pilot-based tracking rather than immediately switching it off. This allows the data-based tracking loop time to observe and correct for residual frequency errors before the total phase error becomes large enough to cause demodulation error.

Figure 10:
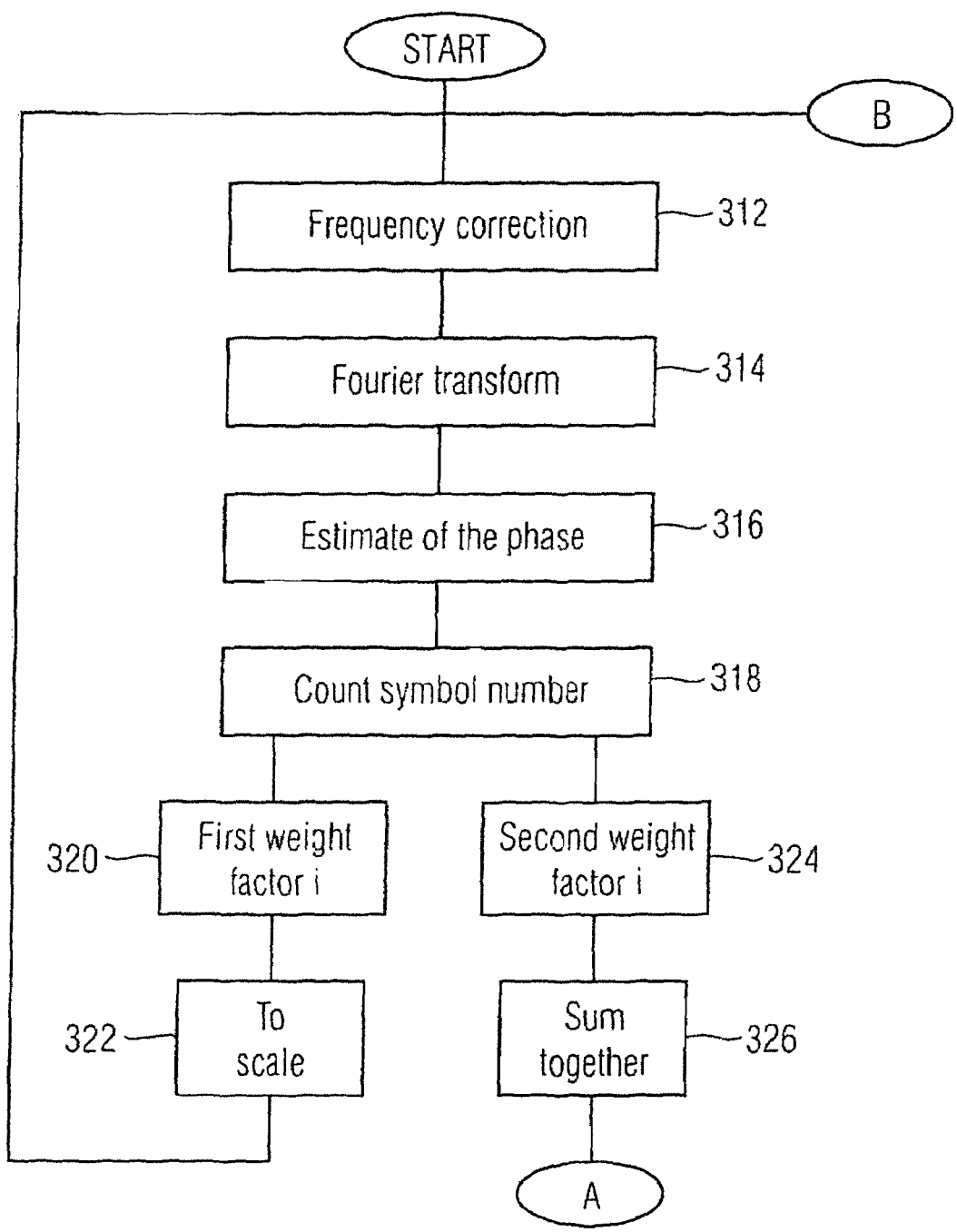
FIGS. 10 (1) and 10 (2) is a more detailed flow chart of the method disclosed in FIG. 9.
Figure 10:
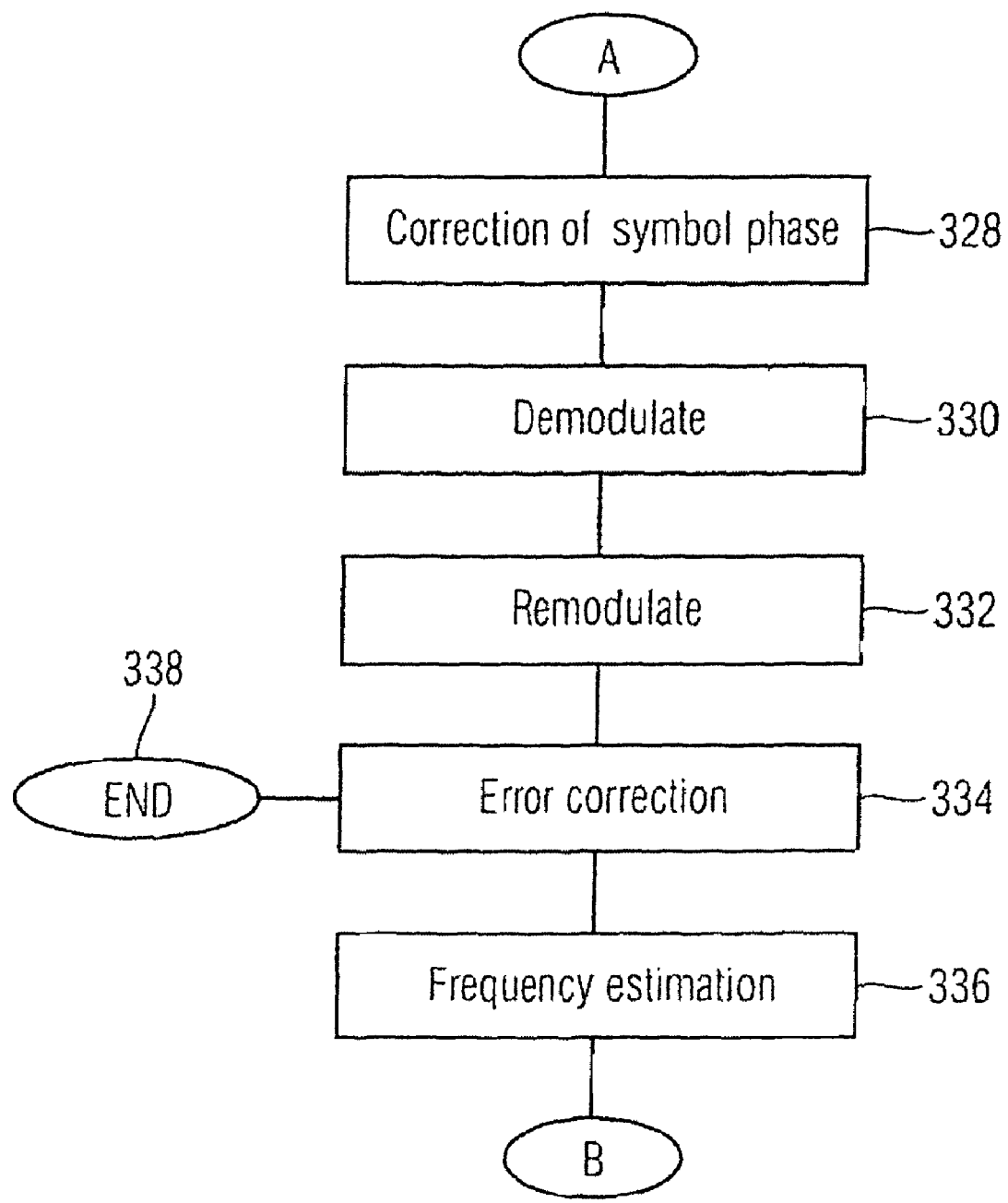

In FIGS. 10 (1) and 10 (2) there is disclosed a more detailed flow chart of the method disclosed in FIG. 9. The method begins at block 310. The method continues, at block 312, with the step: to correct a frequency error of a received symbol. Thereafter, the method continues, at block 314, with the step: to perform a Fourier transform operation resulting in a number of independently modulated subcarriers. The method continues, at block 316, with the step: to perform an estimate of the phase of the received symbol. Thereafter, the method continues, at block 318, with the step: to calculate the phase increment between two consecutive symbols. The method continues, at block 318, with the step: to count the symbol number, i, wherein $1 \leq i \leq n$, wherein n is an integer. Thereafter, the method continues, at block 320, with the step: to weight said phase increment with a first weight factor number i. The method continues, at block 322, with the step: to scale the weighted value number i, to obtain a frequency correction increment output.

Thereafter the method continues, by performing the step according to block 312 of the next symbol. This path of the method only concerns the frequency correction. The phase correction part of the method will be dealt with hereinbelow. The method continues, at block 324, with the step: to weight said phase increment with a second weight factor number i. Thereafter, the method continues, at block 326, with the step: to sum all of said individual phase increments to obtain a phase error estimate output which is input to a function according to block 328. The method then continues, at block 328 of FIG. 10(2), with the step: to perform a correction of the symbol phase. Thereafter, the method continues, at block 330, with the step: to demodulate said phase-corrected symbol to produce a data stream. The method continues, at block 332, with the step: to remodulate said data stream (map it back into I/Q constellation points). Thereafter, the method continues, at block 334, with the step: to perform error correction resulting in a final estimate of the received data symbols. The method continues, at block 336, with the step: to perform a frequency estimation. Thereafter, the method continues, to repeat the step according to block 312 of FIG. 10(1) again. The method is finished at block 338.

According to a preferred embodiment of said method, said weight factors are set to 1 up to where the transition from pilot-based phase and frequency tracking to data-based phase and frequency tracking is therefore completely functional up to this point; the frequency-based tracking may also be active at this stage, but will have little effect since the phase error is being effectively removed (except for a small remaining random error).

According to one embodiment of said method, the first weight factor and the second weight factor for the same symbol, number, i, are equal.

In a digital implementation, the weighting factors will typically be chosen to be simple binary numbers, e.g. a weighting sequence might be 1, 1, . . . 1, 0.75, 0.75, +0.75, 0.5, 0.5, 0.5, 0.25, 0.25, 0.25, 0, 0, . . . .

The transition points for the frequency and phase correction do not need to occur at the same place. For instance, it is advantageous to begin to reduce the frequency error correction little earlier than the phase correction is reduced, so that the magnitude of the frequency deviations is reduced.

In another embodiment of said method, are said first weight factor and said second weight factor for the same symbol number, i, unequal.

In FIG. 11 there is disclosed a schematic diagram of some computer program products according to the present invention. There is disclosed n different digital computers $200_1, \ldots, 200_n$, wherein n is an integer. There is also disclosed n different computer program products $202_1, \ldots, 202_n$, here showed in the form of compact discs. The different computer program products $202_1, \ldots, 202_n$ are directly loadable into the internal memory of the n different digital computers $200_1, \ldots, 200_n$. Each computer program product $202_1, \ldots, 202_n$ comprises software code portions for performing some or all of the steps of FIG. 9 when the product(s) $202_1, \ldots, 202_n$ is/are run on said computer(s) $200_1, \ldots, 200_n$. Said computer program products $202_1, \ldots, 202_n$ can e.g. be in the form of floppy disks, RAM disks, magnetic tapes, opto magnetical disks or any other suitable products.

The invention is not limited to the embodiments described in the foregoing. It will be obvious that many different modifications are possible within the scope of the following claims.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A method for tracking rapid changes in frequency and phase offset in a receiver, the method comprising:
    performing a pilot-based phase and frequency tracking using a pilot-based phase and frequency tracking system;
    performing data-based phase and frequency tracking using a data-based phase and frequency tracking system;
    gradually reducing an effect of said pilot-based phase and frequency tracking using a control system;
    employing gradually decreasing weight factors in order to gradually reduce the effect of said pilot-based phase and frequency tracking using a control system;
    performing an estimate of the phase of a received symbol;
    calculating a phase increment between two consecutive symbols;
    weighting said phase increment with a first weight factor; and
    scaling said weighted value to obtain a frequency correction increment output.

2. A method for tracking rapid changes in frequency and phase offset in a receiver according to claim 1, wherein said method also comprises:
    weighting said phase increment with a second weight factor; and
    summing together all of said individual phase increments to obtain a phase error estimate output.

3. A method for tracking rapid changes in frequency and phase offset in a receiver according to claim 2, wherein said method also comprises:
    counting the received symbols in order to use a weight factor that depends on the symbol number.

4. A method for tracking rapid changes in frequency and phase offset in a receiver according to claim 3, wherein said method also comprises:

correcting a frequency error of a received symbol;
performing a Fourier transform operation resulting in a number of independently modulated subcarriers;
performing a correction of the symbol phase;
demodulating said phase-corrected symbol to produce a data stream;
remodulating said data stream; and
performing an error correction resulting in a final estimate of the received data symbols.

5. A method for tracking rapid changes in frequency and phase offset in a receiver according to claim 4, wherein said weight factors are set to 1 up to where the transition from pilot-based phase and frequency tracking to data-based phase and frequency tracking is to occur.

6. A method for tracking rapid changes in frequency and phase offset in a receiver according to claim 5, wherein said first weight factor and said second weight factor for the same symbol number are equal.

7. A method for tracking rapid changes in frequency and phase offset in a receiver according to claim 5, wherein said first weight factor and said second weight factor for the same symbol number are unequal.

* * * * *